United States Patent
Gur et al.

(10) Patent No.: US 10,712,884 B2
(45) Date of Patent: Jul. 14, 2020

(54) TOUCH SENSOR LOCATING MODE

(71) Applicant: Microsoft Technology Licensing, LLC, Redmond, WA (US)

(72) Inventors: Arie Yehuda Gur, Kiryat Ono (IL); Zohar Nagola, Tel Aviv (IL); Jonathan Westhues, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 5 days.

(21) Appl. No.: 15/960,195

(22) Filed: Apr. 23, 2018

(65) Prior Publication Data
US 2019/0102003 A1   Apr. 4, 2019

Related U.S. Application Data

(60) Provisional application No. 62/567,605, filed on Oct. 3, 2017.

(51) Int. Cl.
   *G06F 3/044*   (2006.01)
   *G06F 3/041*   (2006.01)

(52) U.S. Cl.
   CPC ............ *G06F 3/044* (2013.01); *G06F 3/0416* (2013.01)

(58) Field of Classification Search
   CPC combination set(s) only.
   See application file for complete search history.

(56) References Cited

U.S. PATENT DOCUMENTS

| 2010/0155153 | A1 | 6/2010 | Zachut | |
| 2015/0091859 | A1* | 4/2015 | Rosenberg | G06F 3/044 345/174 |
| 2015/0177868 | A1* | 6/2015 | Morein | G06F 3/044 345/174 |

(Continued)

FOREIGN PATENT DOCUMENTS

WO   2016127117 A1   8/2016

OTHER PUBLICATIONS

"International Search Report and Written Opinion Issued in PCT Application No. PCT/US2018/052768", dated Nov. 30, 2018, 11 Pages.

*Primary Examiner* — Robin J Mishler
(74) *Attorney, Agent, or Firm* — Alleman Hall Creasman & Tuttle LLP

(57) ABSTRACT

Examples are disclosed herein that relate to various operational modes of a capacitive touch sensor. One example provides a touch-sensitive input device comprising receive circuitry, a capacitive touch sensor having a plurality of portions, and a controller. The controller is configured to, responsive to not detecting a finger or a pen, operate the touch sensor in a locating mode by successively driving each portion with a fixed DC voltage and multiplexing the portion to the receive circuitry in a predefined sequence, and responsive to detecting the pen, operate the touch sensor in a tracking mode by driving a selected portion with the fixed DC voltage and multiplexing the selected portion to the receive circuitry to track the pen, the selected portion selected based on a detected location of the pen relative to the touch sensor and being varied as the detected location changes.

19 Claims, 5 Drawing Sheets

(56) References Cited

U.S. PATENT DOCUMENTS

2015/0185810 A1\* 7/2015 Seo ...................... G06F 1/3262
 345/174
2015/0193033 A1 7/2015 Westhues
2016/0162011 A1 6/2016 Verma et al.
2018/0314377 A1\* 11/2018 DeBates ............... G06F 3/0416

\* cited by examiner

TOUCH SENSOR LOCATING MODE

CROSS REFERENCE TO RELATED APPLICATIONS

This application claims priority to U.S. Provisional Patent Application Ser. No. 62/567,605, filed Oct. 3, 2017, the entirety of which is hereby incorporated herein by reference for all purposes.

BACKGROUND

Some touch-sensitive input devices employ a capacitive touch sensor to detect the presence of an input device such as a human finger or pen. In some examples, a capacitive touch sensor may adjust operation depending on the expected or detected presence of a stylus or other input device. For example, the touch sensor may employ one mode of operation specifically for communicating with a pen, and another mode for generally tracking the location of an input device.

DETAILED DESCRIPTION

As described above, some touch-sensitive input devices employ a capacitive touch sensor to detect the presence of an input device such as a human finger or pen (also referred to as a stylus). In some examples, a capacitive touch sensor may adjust operation depending on the expected or detected presence of an input device. For example, the touch sensor may employ one mode of operation specifically for communicating with a pen, and another mode for generally tracking the location of an input device.

Typical capacitive touch sensors employ receive circuitry that repeatedly scans the touch sensor to detect finger and pen inputs via capacitance measurements. The detection is facilitated by drive signals applied at the touch sensor and, in the case of an active pen, from one or more electrodes of the pen. Certain approaches to driving and/or receiving can cause finger detection to be prioritized over detection of a pen. For example, a touch sensor may employ an operational mode optimized for detecting a finger upon device power-on, initiation of a user session, or once a pen falls out of communication range. Typically, such prioritization involves allocating finite detection time toward the task of finger detection and/or diminishing pen detection/latency. Pen latency can degrade the user experience, as a user may perceive a tangible delay between the time the pen is brought within communicative range of the touch sensor and the time at which the pen can be used to provide input to the touch sensor (and potentially the time at which corresponding output is provided, such as graphical output at a display device).

Other issues may arise from prioritizing finger detection over pen detection. In some examples, touch sensors drive electrodes with a time-varying AC voltage when attempting to detect a finger, so that the finger induces a change in electrode current despite being electrically passive. Application of the AC voltage, however, typically will consume more power than DC or relatively simpler waveforms, particularly when AC is persistently used as a default. Further, while the use of the AC voltage may not preclude the detection of an active pen, it can reduce the signal-to-noise ratio (SNR) of such detection. This too may degrade the user experience, for example if an insufficient SNR delays positive detection of the pen until a sufficiently high SNR is obtained, and/or by delaying communication with the pen until the touch sensor switches to a different waveform more conducive to a higher SNR.

Accordingly, implementations are disclosed herein that include an operational mode usable by a capacitive touch sensor to detect fingers and pens with reduced pen interaction latency, power consumption, and noise. This and other described modes of operation may enable selective and efficient use of the touch sensor to account for the presence and absence of fingers and pens.

Figure 1:
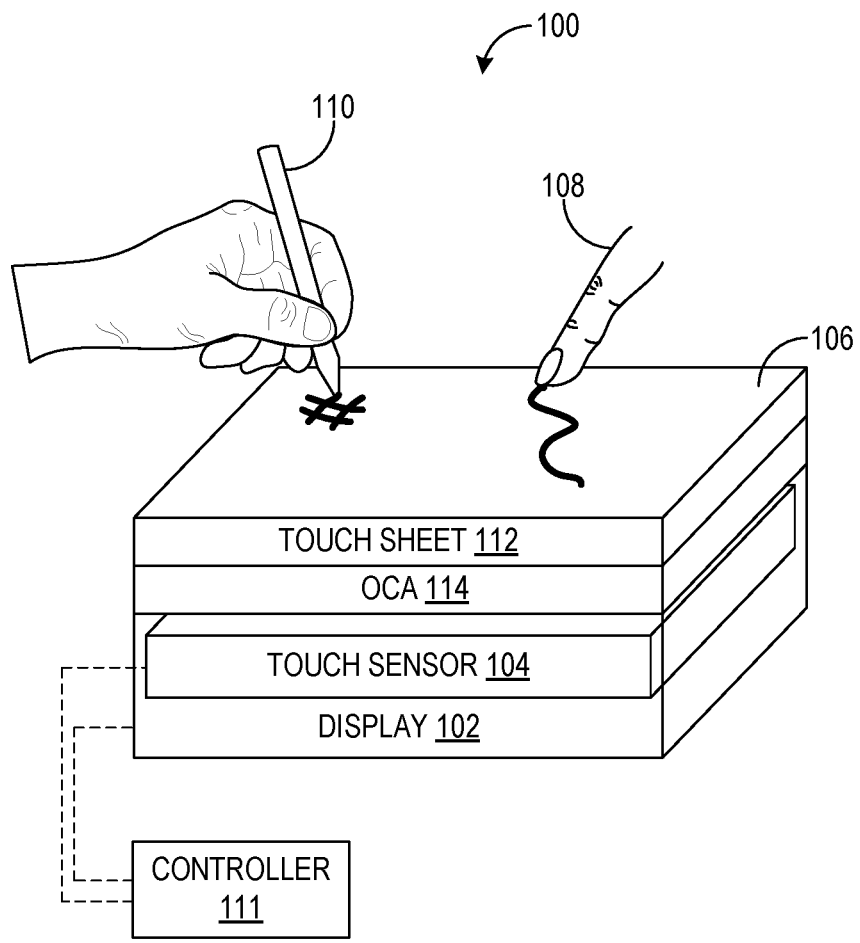
FIG. 1 shows an example touch-sensitive input device.

FIG. 1 shows an example touch-sensitive input device 100 including a display 102 and a capacitive touch sensor 104, which may cooperate to receive input and provide graphical output. Display 102 may selectively emit light in an upward direction to yield viewable imagery at a top surface 106 of the display device or other locations. Display 102 may assume the form of a liquid crystal display (LCD), organic light-emitting diode display (OLED), or any other suitable display.

Touch sensor 104 may receive input in a variety of form(s). As examples, touch sensor 104 and associated componentry may sense touch input from a user's body, such as input applied by a human finger 108 in contact with top surface 106 of input device 100, and/or input from an input device not associated with the user's body such as an electrically active pen 110. Touch sensor 104 may receive input from alternative or additional types of input devices, however. As such, "finger" as used herein may also refer to another part of a user's body, or generally to any suitable electrically passive input device such an inactive pen. Similarly, "pen" as used herein may generally refer to any suitable electrically active input device, including but not limited to a stylus, rotary dial, roller, and/or eraser.

Touch sensor 104 may (1) receive position, tip force/pressure, button state, and/or other pen state information from pen 110; (2) transmit information to the pen; and/or (3) selectively employ different operational modes based on the presence or absence of the pen. Other forms of input sensed at touch sensor 104 may include force/pressure, hover input, and/or the height associated with a hovering input device, for example. Further, touch sensor 104 may receive input from multiple input devices (e.g., fingers, pens, other input devices) simultaneously, in which case input device 100 may be referred to as a "multi-touch" display system. To enable input reception, touch sensor 104 may detect changes associated with the capacitance of a plurality of electrodes, as described in further detail below.

Inputs received by touch sensor 104 may affect any suitable aspect of display 102 and/or a computing device operatively coupled to input device 100, and may include two or three-dimensional finger inputs and/or gestures. As an example, FIG. 1 depicts the output of graphical content by display 102 in spatial correspondence with paths traced out by finger 108 and pen 110 proximate to top surface 106.

A controller 111, coupled to display 102 and touch sensor 104, may control display operation (e.g., pixel output, actuation of drive electronics) and touch sensor operation (e.g., electrode driving and receiving, operating mode selection). A suitable image source, which may be integrated with, or provided separately from, controller 111, may provide graphical content for output by display 102. The image source may be a computing device, for example. While FIG. 1 shows controller 111 as effecting operation of both display 102 and touch sensor 104, separate display and touch sensor controllers may be provided.

Input device 100 may be variously implemented. As examples, input device 100 may be implemented as a so-called "large-format" display device with a diagonal dimension of approximately 1 meter or greater, or as a mobile device (e.g., tablet, smartphone) with a diagonal dimension on the order of inches. Other suitable forms are contemplated, including but not limited to desktop display monitors, high-definition television screens, tablet devices, laptop and other computing devices, etc.

Input device 100 may include other components in addition to display 102 and touch sensor 104. As an example, FIG. 1 shows an optically clear touch sheet 112 providing top surface 106 for receiving touch input as described above. Touch sheet 112 may comprise any suitable materials, such as glass or plastic. Further, an optically clear adhesive (OCA) 114 bonds a bottom surface of touch sheet 112 to a top surface of display 102. As used herein, "optically clear adhesive" refers to a class of adhesives that transmit substantially all (e.g., about 99%) of incident visible light. Input device 100 may include alternative or additional components not shown in FIG. 1, including but not limited to various optical elements (e.g., lens, diffuser, diffractive optical element, waveguide, filter, polarizer).

FIG. 1 depicts the integration of touch sensor 104 within display 102 in a so-called "in-cell" touch sensor implementation. In this example, one or more components of input device 100 may be operated to perform both display output and input sensing functions. As a particular example in which display 102 is an LCD, the same physical electrode structures may be used both for capacitive sensing and for determining the field in the liquid crystal material that rotates polarization to form a displayed image. Alternative or additional components of input device 100 may be employed for display and input sensing functions, however. Further details regarding in-cell implementations are described below with reference to FIG. 2, which shows an example in-cell touch sensor.

Other touch sensor configurations are possible. For example, touch sensor 104 may alternatively be implemented in a so-called "on-cell" configuration, in which the touch sensor is disposed directly on display 102. In an example on-cell configuration, touch sensing electrodes may be arranged on a color filter substrate of display 102. Implementations in which touch sensor 104 is configured neither as an in-cell nor on-cell sensor are possible, however. In such implementations, an OCA may be interposed between display 102 and touch sensor 104, for example. Further details regarding discrete touch sensor implementations are described below.

Figure 2:
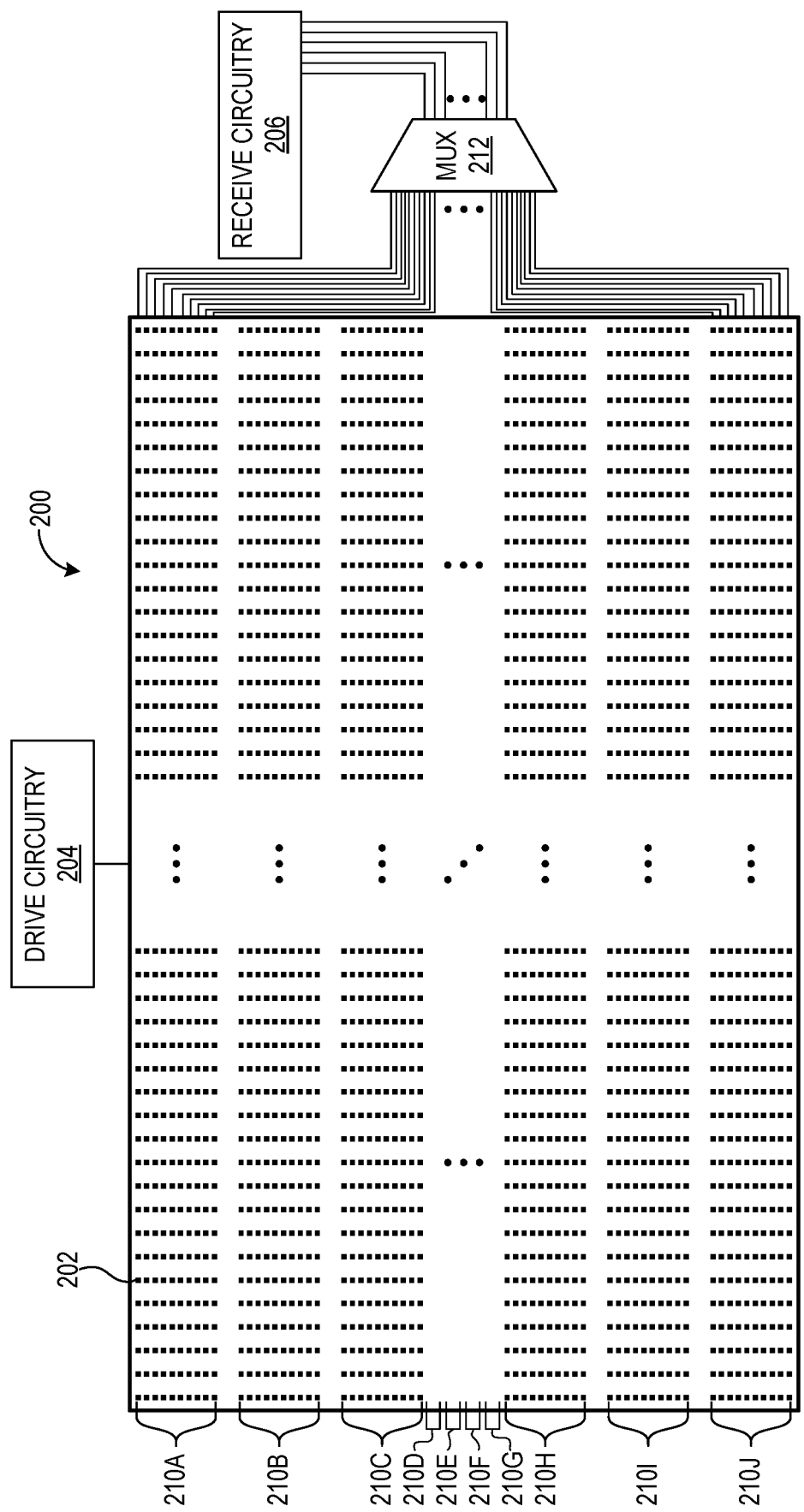
FIG. 2 shows an example in-cell touch sensor.

FIG. 2 shows an example in-cell touch sensor 200 that may employ different operational modes. Touch sensor 200 includes a plurality of electrodes (e.g., electrode 202), each of which are configured to detect touch and/or other inputs by receiving current. The plurality of electrodes is referred to herein as a plurality of "sensels", for example with reference to in-cell and on-cell implementations. To enable sensel charging and the reception of resulting output, the sensels are operatively coupled to drive circuitry 204 and receive circuitry 206. Via drive circuitry 204, each sensel may be selectively driven with a drive signal (also referred to herein as an "excitation sequence" or "waveform"). Via receive circuitry 206, charge induced by such driving, and potentially influenced by other conditions (e.g., finger and/or pen presence), is analyzed to perform input sensing. Touch sensor 200 thus represents a self-capacitance approach to touch sensing, in which the electrical properties of a sensel in relation to circuit ground are measured, rather than in relation to another electrode in the touch sensor.

Touch sensor 200 may employ different drive signals during operation. A first drive signal may take the form of a time-varying voltage that, when digitally sampled, includes a sequence of pulses. The sequence of pulses may include binary values (e.g., 0 or 1, 1 or −1), or three or more values in other implementations. Due to its varying nature, this drive signal is referred to herein as an "AC" drive signal or waveform, and may be used in one or more operational modes to detect and/or locate the presence of a finger and/or pen, as described in further detail below. In contrast, a second drive signal may take the form of a substantially fixed, constant voltage. When digitally sampled, the second drive signal may include a sequence of pulses of constant value (e.g., 0, 1, −1). Due its substantially constant nature, the second drive signal is referred to herein as a "DC" drive signal or waveform, and may be used in one or more operational modes to detect, locate, and/or communicate with a pen. As described in further detail below with reference to FIGS. 3A-3C, the use of different drive signals may enable touch sensor 200 to tailor operation to the particular input device(s) in proximity while reducing power consumption and increasing SNR.

Due to the relatively large number of sensels included in a typical implementation of touch sensor 200, a limited number of sensels are shown in FIG. 2 for simplicity/clarity. Examples described below contemplate a particular configuration in which touch sensor 200 includes 20,000 sensels— e.g., when implemented in a large-format display device. Touch sensor 200 may include any suitable number of sensels, however.

In an example such as that referenced above with 20,000 sensels, the sensels may be arranged in 100 rows and 200 columns. While it may be desirable to maximize sensing frequency by simultaneously measuring capacitance at each sensel, this would entail provision of significant processing and hardware resources. In particular, 20,000 receivers in receive circuitry 206 would be needed to perform full-granularity, simultaneous self-capacitance measurements at each sensel. As such, partial-granularity, multiplexed approaches to self-capacitance measurement may be desired to reduce the volume of receive circuitry 206. Specifically, as described below, receive circuitry capable of servicing only a portion of the touch sensor at one time may be successively connected to different portions of the touch sensor over the course of a touch frame, via time multiplexing, in order to service the entirety of touch sensor 200. A complete scan of all sensels in touch sensor 200—e.g., the eventual connection of receive circuitry to all portions of the touch sensor—may be referred to herein as a "touch frame", though in other examples a touch frame may refer to driving a subset of the sensels and/or receiving at a subset of the sensels, or to multiple scans of a given set of sensels.

FIG. 2 illustrates one example approach to partial-granularity self-capacitance measurement in touch sensor 200. In this approach, the sensels are grouped into horizontal bands 210A-210J, each having ten rows of sensels. Self-capacitance measurements are temporally multiplexed via a multiplexer 212, with a respective timeslot in a touch frame being allocated for performing measurements in each band 210. Accordingly, receive circuitry 206 may include a number of receivers equal to the number of sensels in a given band 210—e.g., 2,000 receivers. For example, the receivers may be connected to one band in a first timeslot, then to another in the next timeslot, and so on. It will be appreciated that the above groupings, bands, number of sensels, etc., reflect but one of many possible implementations. Different numbers of sensels may be employed; shapes and arrangements of groupings may differ from the depicted example; etc. Further, similar multiplexing may be applied in driving the plurality of sensels, such that the sensels are arranged in subsets which are each driven in a corresponding timeslot of a touch frame.

The receivers of receive circuitry 206 may carry out a correlation-based approach to input sensing. In such an approach, each receiver may include an analog-to-digital converter (ADC), and correlation circuitry for correlating (e.g., via the cross-correlation function) sampled current with a reference sequence, yielding an output reflective of the current. The cross-correlation may be computed using digital or analog circuitry, and the ADC may thus sample either current or a correlation result. The output may be a number that is compared to a threshold to determine whether an input device is proximate to touch sensor 200, for example. In some examples, a drive signal used to drive sensels may form the basis for a reference sequence. Further, one or more reference sequences may be designed to mitigate noise for certain operating conditions, noise sources, and/or wavelength bands.

As mentioned above, touch sensor 200 may employ different modes of operation. In a first mode of operation, referred to herein as a "locating" mode, touch frames are structured to include a plurality of timeslots in which a time-varying drive signal is applied to the sensels to detect any proximate finger(s). The presence of a proximate pen may also be detected, as the pen may indicate its presence by transmitting a locating drive signal (e.g., by applying the drive signal to an electrode tip) during these timeslots that induces a corresponding signal at touch sensor 200. While both touch sensor 200 and the pen transmit time-varying drive signals in this scenario, these drive signals may be configured differently such that the signal induced by the pen at the touch sensor is substantially opposite in polarity to the signal induced by finger presence. In this way, touch sensor 200 may differentiate between pen and finger presence, and potentially by using a single reference sequence.

Touch frames in the locating mode of operation may further include timeslots in which a fixed DC drive signal is applied to or held at the sensels. The DC drive signal may enable the reception of transmissions from the pen at a relatively higher SNR than that which would be possible using the AC drive signal. As such, the DC drive signal may enable the detection of a pen whose presence went undetected using the AC drive signal, as the pen's locating drive signal can be received at a higher SNR using the DC drive signal than with the AC drive signal. Accordingly, touch sensor 200 may employ the locating mode and its DC-voltage timeslots to determine pen presence (e.g., upon touch sensor power-on when pen presence is unknown, among other scenarios). The DC drive signal may mitigate the diminishment of pen transmissions that may arise from large hover distance of the pen relative to touch sensor 200, and/or environmental noise, for example, and as such may enable pen detection at higher hover distances than those enabled by the AC drive signal alone. Together, the AC and DC-voltage timeslots in the locating mode enable rapid determination of pen presence while retaining the ability to locate fingers.

Once touch sensor 200 has identified the presence of a pen by detecting the locating drive signal in the locating mode, the touch sensor may engage a tracking mode of operation that includes timeslots in which state information transmitted by the pen can be received. "State information" as used herein refers to data beyond the locating drive signal that enables a pen's use as an input device in conjunction with touch sensor 200, and may include data related to position, tip force/pressure, button state, and/or other information. During these timeslots, touch sensor 200 may employ the DC drive signal to receive state information at high SNRs. However, any suitable type of interaction with a pen may occur in the tracking mode following detection of the pen, alternatively or in addition to the reception of state information. Data of types other than state information may be received from the pen in the tracking mode, for example. The tracking mode may further include a plurality of timeslots in which the AC drive signal is applied in order to detect/locate finger(s) and/or pen(s), which may continue to transmit the locating drive signal during the AC-voltage timeslots. Together, the AC and DC-voltage timeslots in the tracking mode enable the positional tracking of fingers and pens as well as the reception of state information enabling pen input to touch sensor 200.

Touch sensor 200 may sequence DC-voltage timeslots differently between the locating and tracking modes of operation. In the locating mode, touch sensor 200 may arrange the DC-voltage timeslots in a predefined sequence—for example, such that bands 210 are successively scanned from band 210A through band 210J. This may ensure that a proximate pen, whose location relative to touch sensor 200 is unknown until the locating drive signal is detected, is located (at least roughly) once all bands are scanned. Conversely, touch sensor 200 may dynamically sequence DC-voltage timeslots in the tracking mode according to the detected or expected location of a pen. With reference to the time-multiplexed approach described above, touch sensor 200 may allocate DC-voltage timeslots for only those band (s) 210 that are multiplexed to receive circuitry 206 as a result of the detected or expected presence of the pen therein. The pen's location may be informed by one or more of (1) a locating drive signal transmitted during the locating mode (in one or more AC or DC-voltage timeslots), (2) a locating signal transmitted during dynamically sequenced timeslots in which receive circuitry is multiplexed to electrodes near the detected or expected location of the pen, which may additionally carry state information from the pen to the touch sensor, and (3) a locating drive signal transmitted during statically sequenced AC-voltage timeslots. In some implementations, some or all dynamically sequenced DC-voltage timeslots may be replaced with AC-voltage timeslots, optionally with different excitation voltage magnitude, in order to locate fingers in the same band(s) as the pen(s) simultaneously while locating the pen(s).

In some examples, touch sensor 200 may dynamically modify its touch frame structure to enable state information to be received from a pen in the same frame in which the pen is detected. In other examples, the pen may transmit state information in a touch frame subsequent to a frame in which the locating drive signal is transmitted to yield pen detection. For example, touch sensor 200 may detect the locating drive signal in a touch frame of the locating mode, and in response follow the touch frame with a subsequent touch frame in the tracking mode in which the state information can be received via the DC-voltage timeslots therein.

By structuring touch frames in the locating and tracking modes of operation to include DC-voltage timeslots, power consumption at touch sensor 200 may be reduced by avoiding greater power expenditure associated with the AC drive signal. Such power savings may be obtained both during periods in which the pen does and does not transmit. Further, pen interaction latency, and time spent by touch sensor 200 communicating with the pen in the tracking mode, may be reduced by sequencing DC-voltage timeslots for those touch sensor portion(s) localized to the location of the pen, particularly relative to approaches that merely employ AC drive signals to identify pen presence. As described above, the DC drive signal may enable pen detection at higher SNRs and thus greater hover distances from touch sensor 200 at which a pen can be detected, rendering pen detection faster than detection with AC drive signals, which impose greater detection times by requiring a pen to be brought within closer proximity to a touch sensor. Being capable of both finger and pen detection, the locating mode may be suitable for use as a low-power and/or idle mode of operation from which to awake. As examples, touch sensor 200 may employ the locating mode upon power-on, upon initiation of a new user session, upon failing to detect any proximate input devices for a threshold duration, and/or generally when input device presence is unknown.

Touch sensor 200 may employ alternative or additional modes of operation. For example, touch sensor 200 may employ a finger mode in which touch frames are structured to include timeslots for detecting finger location via the AC drive signal, without timeslots allocated for receiving state information from pens. In this way, the finger mode may prioritize finger tracking yet remain responsive to the entry of a proximate pen. Together, the locating, tracking, and finger modes of operation may enable touch sensor 200 to tailor operation to the specific input device(s) that are in proximity, with reduced pen interaction latency and power consumption, and increased SNR. Additional detail regarding the operational modes is described below with reference to FIGS. 3A-3C, which show example touch frames in each mode.

In some implementations, touch sensor 200 may apply multiple drive signals to the sensels during an operational mode. In one example approach, touch sensor 200 may apply a different drive signal to each band 210. A pen may be configured to correlate each band-specific drive signal such that, upon identifying a strongest band-specific drive signal, the pen may determine its location as occupying the corresponding band. The division of touch sensor 200 into different bands of operation by the application of band-specific drive signals is but one example of arranging the touch sensor into different regions of operation with associated drive signals. For example, other arrangements may include other numbers of bands; other rectangular geometries (including partial bands); non-rectangular geometries; irregular geometries; non-Euclidean geometries; and/or portions, and not the entirety, of touch sensor 200.

Figure 3A:
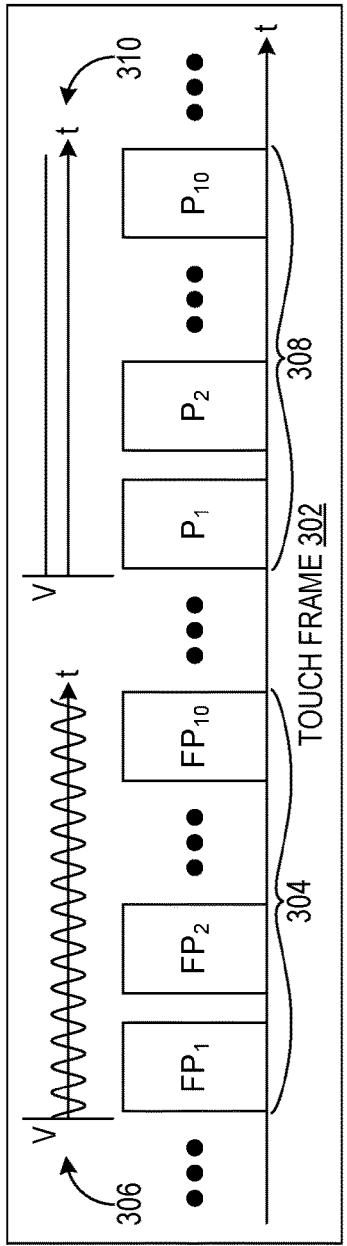
FIGS. 3A-3C respectively show an example touch frame in a corresponding touch sensor operational mode.

To illustrate the use of the operational modes described above, FIGS. 3A-3C respectively show an example touch frame in a corresponding operational mode. In particular, FIG. 3A shows an example touch frame 302 in the locating operational mode. Touch frame 302 includes a plurality of timeslots 304 allocated for detecting/locating the presence of a finger and/or pen, and are abbreviated "FP" in FIGS. 3A-3C. Further, timeslots 304 are structured in relation to a time-multiplexed approach as described above. With exemplary reference to touch sensor 200, touch frame 302 includes ten timeslots 304 each allocated for scanning in a respective band 210, which is indicated via subscripts provided for each "FP" abbreviation. Timeslots 304 are arranged such that the bands are successively scanned in a predefined order (e.g., from band 210A through band 210J). As indicated at 306, touch sensor 200 transmits the time-varying AC drive signal during timeslots 304 so that a proximate finger induces a detectable signal, yet a proximate pen remains detectable.

Touch frame 302 further includes a plurality of timeslots 308 allocated for receiving a locating drive signal from a proximate pen. Timeslots 308 are abbreviated "P" in FIGS. 3A and 3B, and, like timeslots 304, are structured in relation to a time-multiplexed approach as described above. With exemplary reference to touch sensor 200, touch frame 302 includes ten timeslots 308 each allocated for receiving the locating drive signal in a respective band 210. Timeslots 308 are arranged in a predefined order such that bands 210 are successively scanned (e.g., from band 210A through band 210J), as the band occupied by the pen may be unknown or only coarsely known (e.g., the pen location may have been merely localized to a subset of bands via a locating drive signal received during an FP timeslot 304). As indicated at 310, touch sensor 200 transmits the DC drive signal during timeslots 308 to receive the locating drive signal with high SNR.

By structuring touch frame 302 to include specialized P timeslots using DC drive for high SNR reception of the pen locating signal, touch sensor 200 may reduce the latency of pen interaction. While the locating mode may introduce some latency for a finger that comes into proximity during timeslots 308 (as the finger may go undetected until FP timeslots 304 occur in a subsequent touch frame), touch sensor 200 may engage an operational mode specifically configured for tracking the finger with minimized latency in the absence of a proximate pen. If instead a pen is recognized in the locating mode, touch sensor 200 may engage the tracking mode.

Figure 3B:
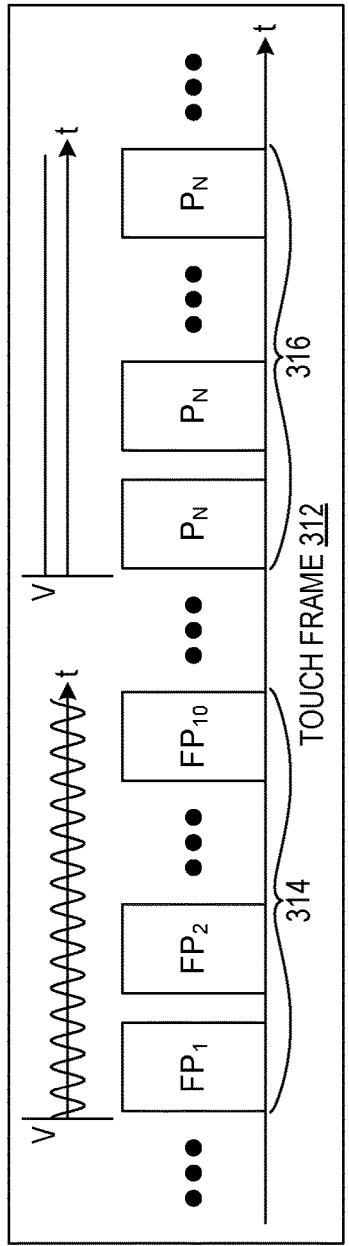

FIG. 3B shows an example touch frame 312 in the tracking mode. Like touch frame 302 in the locating mode, touch frame 312 includes a plurality of FP timeslots 314 allocated for detecting/locating a finger and/or pen via the AC drive signal, followed by a plurality of P timeslots 316 allocated for receiving pen transmissions via the DC drive signal. Unlike the P timeslots 308 in the locating mode, however, P timeslots 316 in the tracking mode are spatially conducted in a dynamically selected sequence that varies according to the detected location of the pen. With exemplary reference to touch sensor 200, for each P timeslot 316, the particular band 210 occupied by the detected location of the pen in that timeslot is multiplexed to receive circuitry 206, as indicated by the generic "N" subscript in FIG. 3B. In this way, touch sensor 200 may persistently track the pen throughout timeslots 316 in a low-latency manner, remaining able to receive state information transmitted during one or more of these timeslots. However, timeslots in which touch sensor 200 communicates with the pen may involve the reception of data types other than state information, and/or any other suitable paradigm of sensor-pen communication.

The tracking mode also enables touch sensor 200 to remain responsive to finger inputs via the inclusion of FP timeslots 314. If a pen tracked in the tracking mode falls out of a detectable range of touch sensor 200 for a threshold duration (e.g., the pen goes undetected for an entire touch frame), and a finger is detected or tracked in the threshold duration, the touch sensor may switch from the tracking mode to the finger mode, as described below. If instead a tracked pen falls out of the detectable range for the threshold duration, and no fingers are detected or tracked in the threshold duration, the touch sensor may switch from the tracking mode to the locating mode. Other triggers for engaging the operational modes described herein are possible, however. For example, a computing device operatively coupled to touch sensor 200 may direct the touch sensor to engage the finger mode in response to the execution on the computing device of an application that supports finger but not pen input.

Figure 3C:
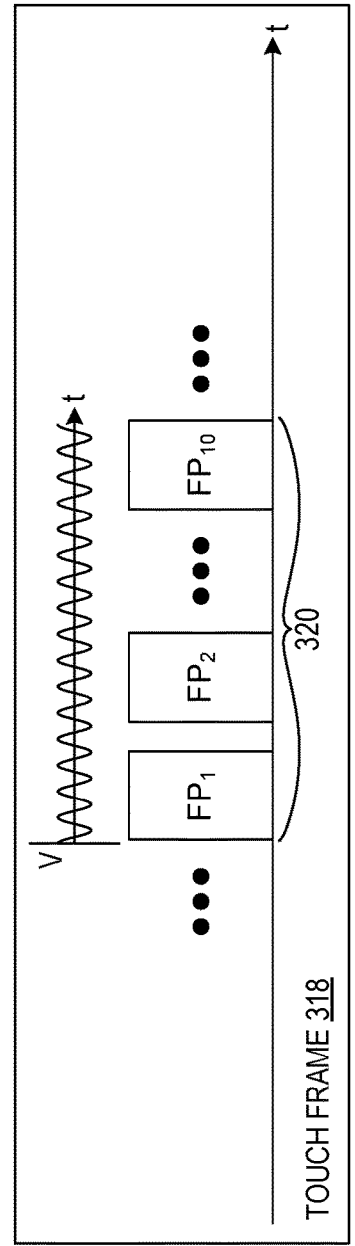

FIG. 3C shows an example touch frame 318 in the finger mode. Touch frame 318 is structured to include a plurality of FP timeslots 320 allocated for detecting/locating a finger via the AC drive signal. With exemplary reference to touch sensor 200, timeslots 320 are arranged such that each band 210 is successively scanned in a predefined sequence (e.g., from band 210A through band 210J). In response to identifying the presence of a pen (e.g., via the locating drive signal received in one or more FP timeslots 320), touch sensor 200 may switch from the finger mode to the tracking mode. Further, if a finger tracked in the finger mode falls out of a detectable range from touch sensor 200 for a threshold duration (e.g., the finger goes undetected for an entire touch frame), and no pens are detected during the threshold duration, the touch sensor may switch from the finger mode to the locating mode.

Taken together, the locating, tracking, and finger modes of operation enable the use of fingers, pens, and other input devices to interact with touch sensor 200 at low latencies by allowing the touch sensor to dynamically tailor operation to the specific input device(s) that are proximate to the touch sensor. Further, as described above, the use of the DC drive signal may allow touch sensor 200 to receive pen transmissions at higher SNRs, detect pen presence that might otherwise be missed when using the AC drive signal, and reduce power consumption by reducing the frequency at which the AC drive signal is used.

As indicated by the ellipses shown in FIGS. 3A-3C, touch frames 302, 312, and 318 may include alternative or additional timeslots configured for a variety of purposes. As one example, touch sensor 200 may interleave one or more P timeslots 316 with one or more FP timeslots 314, or one or more P timeslots 308 with one or more FP timeslots 304. As another example, touch sensor 200 may arrange the plurality of P timeslots (e.g., timeslots 316) in a given touch frame before the plurality of FP timeslots (e.g., timeslots 314) in that touch frame. Generally, touch sensor 200 may arrange FP and P timeslots in any suitable grouping and ordering. Such arrangement may be balanced, however, with discontinuities that can arise from interleaving timeslots of different types. For example, the location of a moving finger tracked across two successive FP timeslots may appear to jump discontinuously between locations corresponding respectively to the two FP timeslots, when those FP timeslots are interrupted by an interleaved P timeslot. Touch sensor 200 may extrapolate (e.g., based on a motion vector) the movement of a finger or other moving input device to mitigate this issue. Moreover, the approaches described herein may be extended to the detection of and/or communication with multiple input devices in range of touch sensor 200. For example, touch sensor 200 may detect two active pens in the locating mode, and subsequently transition to operation in the tracking mode, in which P timeslots are allocated for scanning the touch sensor in the portion(s) that correspond to the locations of the two pens.

Touch frames 302, 312, and/or 318 may include timeslot types other than FP and P type timeslots. For example, touch sensor 200 may include one or more synchronization timeslots in which the touch sensor transmits a synchronization beacon for reception by proximate pens. The synchronization beacon may allow a pen to obtain a shared sense of time with touch sensor 200 by apprising the pen of the timing of timeslots in a touch frame. With this shared sense of time, the pen may constrain transmissions to appropriate timeslots, such as by transmitting the locating drive signal during FP timeslots in the locating mode, and/or during FP slots in the tracking mode (and not during P timeslots in the tracking mode), and state information during P timeslots in the tracking mode (and not during FP timeslots in the tracking mode, or during any timeslots in the locating mode). The synchronization beacon may include an identifier of touch sensor 200, cryptographic keys, configuration information, and/or any other suitable data, and may cause a pen receiving the beacon to awaken from a low-power (e.g., sleep) mode and enter an active mode in which transmissions occur. In some examples, touch sensor 200 may broadcast two synchronization beacons in a touch frame (e.g., one before the first FP timeslot, and another before the first P timeslot or toward the middle of the touch frame) to reduce pen interaction latency, though the number of synchronization beacons may be balanced with other tasks to which other portions of the touch frame are allocated.

Touch frames 302, 312, and/or 318 may include one or more noise timeslots in which aspect(s) of noise in measurements taken by touch sensor 200 are evaluated. For example, touch sensor 200 may evaluate noise in applying a noise reduction algorithm, and/or in performing frequency hopping (e.g., in relation to one or more drive signals employed by the touch sensor). Other timeslot types may form part of touch frames 302, 312, and/or 318, or may generally be considered in relation to the touch frames. Such timeslots may relate to a display (e.g., display 102) operatively coupled to touch sensor 200, and may include a vertical blank interval and/or display timeslot(s) in which pixels of the display are refreshed/updated. For example, display timeslots may be interleaved with timeslots allocated for performing pen/finger detection/communication, which may increase SNR by minimizing crosstalk between the display and touch sensor 200.

The approaches described herein including the different operational modes may be adapted to touch sensors other than touch sensor 200. For example, a touch sensor that performs input detection by measuring mutual capacitance between different electrodes may be configured to use one or more of the locating, tracking, and finger modes of operation. The touch sensor may selectively multiplex different subsets of electrodes (which may be arranged as elongate row/column electrodes, pads in a common plane, meshes, or in any other suitable arrangement) to receive circuitry and allocate timeslots according to such multiplexed subsets. The subsets may include rectangular bands of electrodes, or rectilinear groupings, or any other suitable type of grouping.

Figure 4:
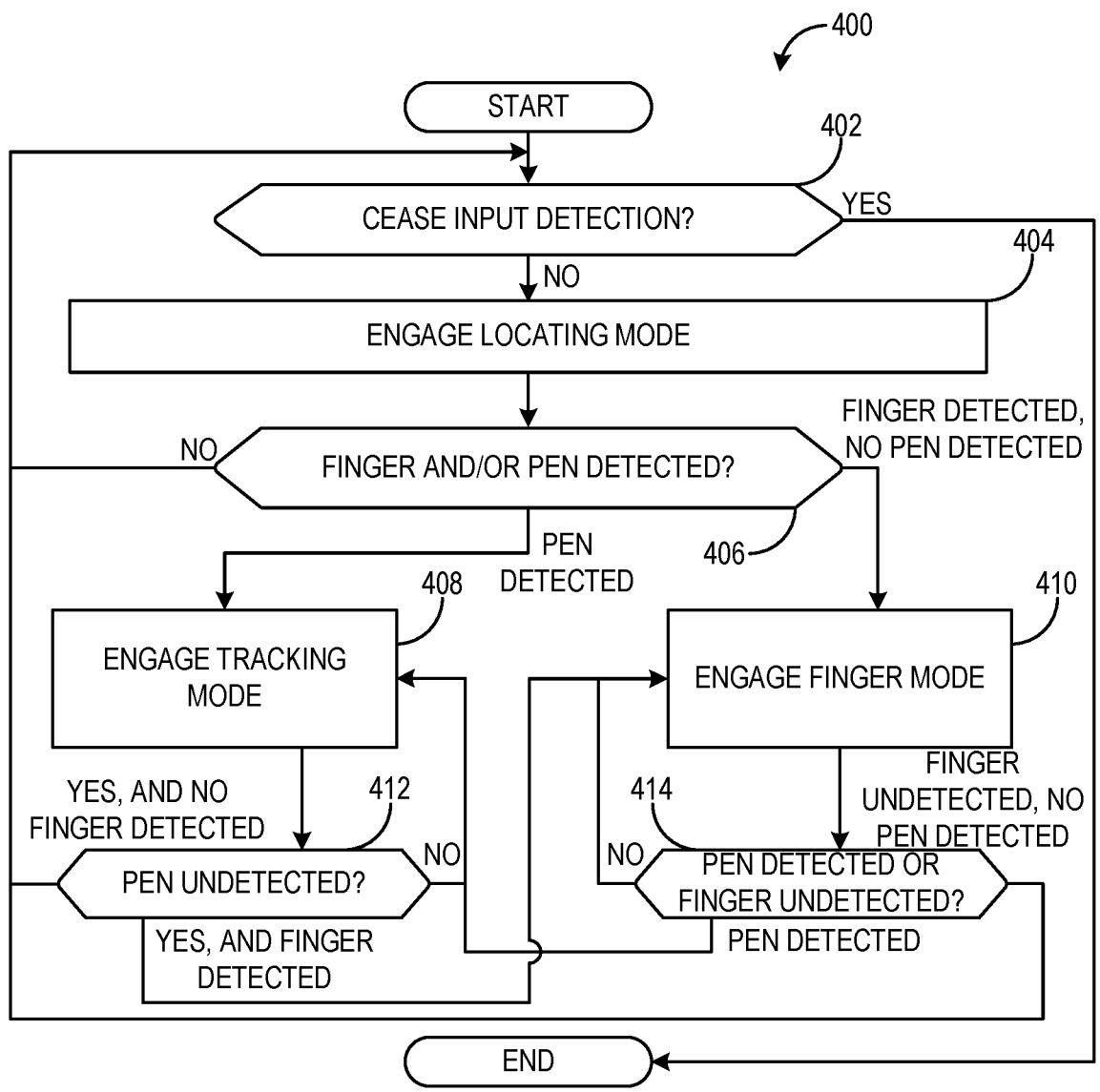
FIG. 4 shows a flowchart illustrating an example method of controlling a touch sensor according to different operational modes.

FIG. 4 shows a flowchart illustrating an example method 400 of controlling a touch sensor according to different operational modes. Method 400 may be implemented on touch sensor 200, for example.

At 402, method 400 includes determining whether to cease detection of an input device. Method 400 may proceed directly to 404 upon the first iteration of the method, as this evaluation may be used to consider conditions in which it is appropriate to cease input detection, after input detection has been initiated—e.g., during a second or later iteration of the method. If it is determined at 402 that input detection should be ceased (YES), method 400 ends. If it is determined at 402 that input detection should not be ceased (NO), method 400 proceeds to 404.

At 404, method 400 includes engaging a locating operational mode of the touch sensor. In the locating mode, the touch sensor may scan for input devices across touch frames that include FP slots for identifying/locating finger(s) and/or pen(s) using an AC drive signal, and P slots for performing input detection using a DC drive signal. The P slots may be arranged in a predefined sequence—e.g., such that a plurality of portions of the touch sensor such as bands are successively scanned.

At 406, method 400 includes determining whether a finger and/or a pen is detected in the locating mode. If neither a finger nor a pen are detected (NO), method 400 returns to 402. If a pen is detected (PEN DETECTED), method 400 proceeds to 408. If a finger is detected but a pen is not detected (FINGER DETECTED, NO PEN DETECTED), method 400 proceeds to 410.

At 408, method 400 includes engaging a tracking operational mode of the touch sensor. In the tracking mode, the touch sensor may scan for finger(s) and/or pen(s) using FP slots, and receive state information using P slots. However, the P slots may be arranged in a dynamically selected sequence according to the tracked or expected location of the detected pen. For example, only a selected portion of the touch sensor may be multiplexed to receive circuitry in a P slot, where the selected portion is that to which the detected or expected location of the detected pen corresponds in the P slot.

At 412, method 400 includes determining whether the pen has gone undetected. For example, method 400 may determine whether the pen has gone undetected for a threshold duration such as an entire touch frame. If it is determined that the pen has not gone undetected (NO), method 400 returns to 408 where operation in the tracking mode continues. If it is determined that the pen has gone undetected and no finger is detected (YES, AND NO FINGER DETECTED), method 400 returns to 402. If it is determined that the pen has gone undetected and a finger is detected (YES, AND FINGER DETECTED), method 400 proceeds to 410.

At 410, method 400 includes engaging a finger operational mode of the touch sensor. In the finger mode, the touch sensor may scan for finger(s) using FP slots. The FP slots may be further usable to detect the presence of a pen (e.g., by detecting a locating drive signal transmitted by the pen). The FP slots may be arranged in a predefined sequence—e.g., such that a plurality of portions of the touch sensor such as bands are successively scanned. Alternatively or additionally, the FP slots in the finger mode may be dynamically selected according to the detected or expected location of the detected finger.

At 414, method 400 includes determining whether the detected finger has gone undetected, or whether a pen has been detected in the finger mode. For example, method 400 may determine whether the finger has gone undetected for a threshold duration such as an entire touch frame. If it is determined that neither the finger has gone undetected, nor a pen has been detected (NO), method 400 returns to 410 where operation in the finger mode continues. If it is determined that the finger has gone undetected and no pen is detected (FINGER UNDETECTED, NO PEN DETECTED), method 400 returns to 402. If it is determined that a pen is detected (PEN DETECTED), whether the finger has gone undetected or remains detected, method 400 proceeds to 408 where the tracking mode is engaged.

If it is determined at 402 that input detection should not cease, method 400 may identify an operational mode appropriate for the particular types of input device(s) that are in proximity. In this way, method 400 may tailor touch sensor operation to instant operating conditions to reduce latency and maximize the user experience associated with providing input via fingers and/or pens.

At 402, method 400 may consider various conditions in determining whether to cease input detection. For examples in which the touch sensor is operatively coupled to a computing device, method 400 may cease input detection if instructed to by the computing device, for example in response to the termination of a user session on the computing device, initiation of a new user session on the computing device, and/or execution of an application on the computing device that does not support input via the touch sensor.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
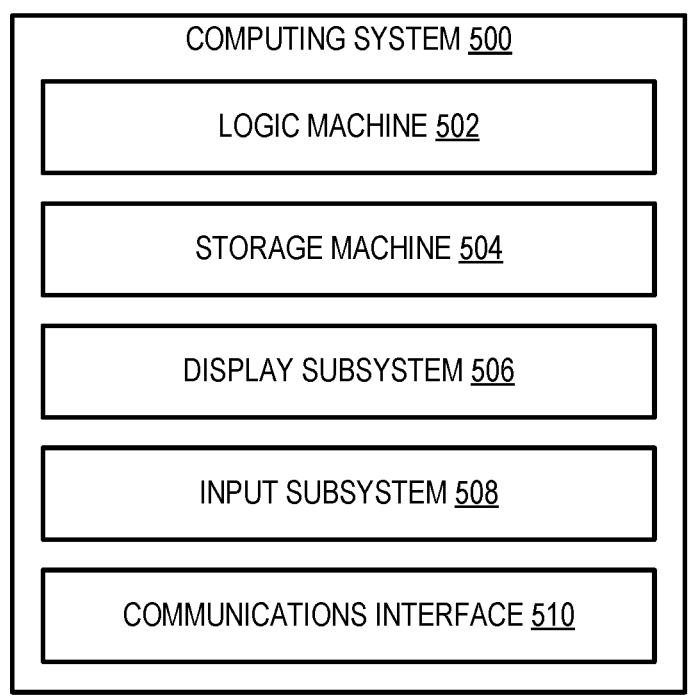
FIG. 5 shows a block diagram of an example computing device.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 502 and a storage machine 504. Computing system 500 may optionally include a display subsystem 506, input subsystem 508, communication subsystem 510, and/or other components not shown in FIG. 5.

Logic machine 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 504 includes one or more physical devices configured to hold instructions executable by the logic machine to implement the methods and processes described herein. When such methods and processes are implemented, the state of storage machine 504 may be transformed—e.g., to hold different data.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 502 executing instructions held by storage machine 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage machine 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

Another example provides a touch-sensitive input device comprising receive circuitry, a capacitive touch sensor having a plurality of portions, and a controller configured to responsive to not detecting a finger or a pen, operate the touch sensor in a locating mode by successively driving, for a touch frame of the locating mode, each portion of the touch sensor with a fixed DC voltage and multiplexing the portion of the touch sensor to the receive circuitry in a predefined sequence, and responsive to detecting the pen in the locating mode, operate the touch sensor in a tracking mode by driving, for a touch frame of the tracking mode, a selected portion of the touch sensor with the fixed DC voltage and multiplexing the selected portion to the receive circuitry to track the pen, the selected portion selected based on a detected location of the pen relative to the touch sensor and being varied as the detected location changes in the touch frame of the tracking mode. In such an example, the predefined sequence may be defined such that each portion of the touch sensor is successively multiplexed to the receive circuitry in the touch frame. In such an example, the controller alternatively or additionally may be configured to, in both the locating mode and the tracking mode, successively drive each portion of the touch sensor with a time-varying voltage and multiplex the portion of the touch sensor to the receive circuitry to detect the finger or the pen. In such an example, the controller alternatively or additionally may be configured to multiplex the portion of the touch sensor driven with the time-varying voltage to the receive circuitry in the predefined sequence. In such an example, the controller alternatively or additionally may be configured to, responsive to detecting the finger and not the pen, operate the touch sensor in a finger mode by successively driving each portion of the touch sensor with a time-varying voltage and multiplexing the portion of the touch sensor to the receive circuitry to track the finger. In such an example, in the finger mode, the controller alternatively or additionally may be configured to successively drive each portion of the touch sensor with the time-varying voltage and not drive any portion of the touch sensor with the fixed DC voltage. In such an example, the touch frames of both the locating mode and the tracking mode each may include a plurality of timeslots each allocated for scanning a corresponding portion of the touch sensor. In such an example, the touch frames of both the locating mode and the tracking mode alternatively or additionally may include one or more timeslots allocated for transmitting a synchronization beacon to the pen that enables the pen to obtain a shared sense of time with the touch sensor. In such an example, the controller alternatively or additionally may be configured to detect the pen based on a locating drive signal transmitted from the pen while the portion of the touch sensor is driven with a time-varying voltage. In such an example, the controller alternatively or additionally may be configured to receive, in the tracking mode, state information transmitted from the pen. In such an example, the controller alternatively or additionally may be configured to interleave, in a common touch frame, driving the touch sensor with the fixed DC voltage, with driving the touch sensor with a time-varying voltage. In such an example, the controller alternatively or additionally may be configured to operate the touch sensor in the locating mode upon power-on of the touch sensor. In such an example, the controller alternatively or additionally may be configured to dynamically modify a touch frame structure to detect the pen and receive state information transmitted from the pen in a common touch frame.

Another example provides, on a capacitive touch sensor having a plurality of portions, a method, comprising responsive to not detecting a finger or a pen, operating the touch sensor in a locating mode by successively driving, for a touch frame of the locating mode, each portion of the touch sensor with a fixed DC voltage and multiplexing the portion of the touch sensor to receive circuitry in a predefined sequence, and responsive to detecting the pen in the locating mode, operating the touch sensor in a tracking mode by driving, for a touch frame of the tracking mode, a selected portion of the touch sensor with the fixed DC voltage and multiplexing the selected portion to the receive circuitry to track the pen, the selected portion selected based on a detected location of the pen relative to the touch sensor and being varied as the detected location changes in the touch frame of the tracking mode. In such an example, the predefined sequence may be defined such that each portion of the touch sensor is successively multiplexed to the receive circuitry in the touch frame. In such an example, the method alternatively or additionally may comprise, in both the locating mode and the tracking mode, successively driving each portion of the touch sensor with a time-varying voltage and multiplexing the portion of the touch sensor to the receive circuitry to detect the finger or the pen. In such an example, the portion of the touch sensor driven with the time-varying voltage alternatively or additionally may be multiplexed to the receive circuitry in the predefined sequence. In such an example, the method alternatively or additionally may comprise, responsive to detecting the finger and not the pen, operating the touch sensor in a finger mode by successively driving each portion of the touch sensor with a time-varying voltage and multiplexing the portion of the touch sensor to the receive circuitry to track the finger.

Another example provides a touch-sensitive input device comprising a capacitive touch sensor, and a controller configured to operate the capacitive touch sensor in a locating mode by driving the touch sensor with a fixed DC voltage according to a predefined sequence to thereby locate a pen, upon locating the pen, operate the touch sensor in a tracking mode by driving the touch sensor with the fixed DC voltage according to a dynamically selected sequence to thereby track the pen, the dynamically selected sequence selected based on a detected location of the pen relative to the touch sensor and being varied as the detected location changes in the tracking mode, and upon locating a finger and not the pen, operate the touch sensor in a finger mode by driving the touch sensor with a time-varying voltage according to the predefined sequence. In such an example, the touch-sensitive input device alternatively or additionally may comprise receive circuitry, and the predefined sequence may be defined such that each of a plurality of portions of the touch sensor is successively multiplexed to the receive circuitry in a touch frame.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A touch-sensitive input device, comprising:
receive circuitry;
a capacitive touch sensor having a plurality of portions; and
a controller configured to:
responsive to detecting an absence of a finger or a pen, operate the touch sensor in a locating mode by successively driving, for a touch frame of the locating mode, each portion of the touch sensor with a fixed DC voltage and multiplexing the portion of the touch sensor to the receive circuitry in a predefined sequence;
responsive to detecting the pen in the locating mode, operate the touch sensor in a tracking mode by driving, for a touch frame of the tracking mode, a selected portion of the touch sensor with the fixed DC voltage and multiplexing the selected portion to the receive circuitry in a dynamically selected sequence to track the pen, the selected portion selected based on a detected location of the pen relative to the touch sensor and being varied as the detected location changes in the touch frame of the tracking mode; and
responsive to detecting the finger and the absence of the pen, operate the touch sensor in a finger mode by successively driving each portion of the touch sensor with a time-varying voltage and multiplexing the portion of the touch sensor to the receive circuitry to track the finger.

2. The touch-sensitive input device of claim 1, where the predefined sequence is defined such that each portion of the touch sensor is successively multiplexed to the receive circuitry in the touch frame.

3. The touch-sensitive input device of claim 1, where the controller is configured to, in both the locating mode and the tracking mode, successively drive each portion of the touch sensor with the time-varying voltage and multiplex the portion of the touch sensor to the receive circuitry to detect the finger or the pen.

4. The touch-sensitive input device of claim 3, where the controller is configured to multiplex the portion of the touch sensor driven with the time-varying voltage to the receive circuitry in the predefined sequence.

5. The touch-sensitive input device of claim 1, where, in the finger mode, the controller is configured to successively drive each portion of the touch sensor with the time-varying voltage and not drive any portion of the touch sensor with the fixed DC voltage.

6. The touch-sensitive input device of claim 1, where the touch frames of both the locating mode and the tracking mode each include a plurality of timeslots each allocated for scanning a corresponding portion of the touch sensor.

7. The touch-sensitive input device of claim 1, where the touch frames of both the locating mode and the tracking mode further include one or more timeslots allocated for transmitting a synchronization beacon to the pen that enables the pen to obtain a shared sense of time with the touch sensor.

8. The touch-sensitive input device of claim 1, where the controller is configured to detect the pen based on a locating drive signal transmitted from the pen while the portion of the touch sensor is driven with the time-varying voltage.

9. The touch-sensitive input device of claim 1, where the controller is configured to receive, in the tracking mode, state information transmitted from the pen.

10. The touch-sensitive input device of claim 1, where the controller is configured to interleave, in a common touch frame, driving the touch sensor with the fixed DC voltage, with driving the touch sensor with the time-varying voltage.

11. The touch-sensitive input device of claim 1, where the controller is configured to operate the touch sensor in the locating mode upon power-on of the touch sensor.

12. The touch-sensitive input device of claim 1, where the controller is configured to dynamically modify a touch frame structure to detect the pen and receive state information transmitted from the pen in a common touch frame.

13. On a capacitive touch sensor having a plurality of portions, a method, comprising:
responsive to detecting an absence of a finger or a pen, operating the touch sensor in a locating mode by successively driving, for a touch frame of the locating mode, each portion of the touch sensor with a fixed DC voltage and multiplexing the portion of the touch sensor to receive circuitry in a predefined sequence;
responsive to detecting the pen in the locating mode, operating the touch sensor in a tracking mode by driving, for a touch frame of the tracking mode, a selected portion of the touch sensor with the fixed DC voltage and multiplexing the selected portion to the receive circuitry in a dynamically selected sequence to track the pen, the selected portion selected based on a detected location of the pen relative to the touch sensor and being varied as the detected location changes in the touch frame of the tracking mode; and
responsive to detecting the finger and not the pen, operating the touch sensor in a finger mode by successively driving each portion of the touch sensor with a time-varying voltage and multiplexing the portion of the touch sensor to the receive circuitry to track the finger.

14. The method of claim 13, where the predefined sequence is defined such that each portion of the touch sensor is successively multiplexed to the receive circuitry in the touch frame.

15. The method of claim 13, further comprising, in both the locating mode and the tracking mode, successively driving each portion of the touch sensor with the time-varying voltage and multiplexing the portion of the touch sensor to the receive circuitry to detect the finger or the pen.

16. The method of claim 13, where the portion of the touch sensor driven with the time-varying voltage is multiplexed to the receive circuitry in the predefined sequence.

17. A touch-sensitive input device, comprising:
a capacitive touch sensor; and
a controller configured to:
operate the capacitive touch sensor in a locating mode by successively driving the touch sensor with a fixed DC voltage according to a predefined sequence to thereby locate a pen;
upon locating the pen, operate the touch sensor in a tracking mode by driving the touch sensor with the fixed DC voltage according to a dynamically selected sequence to thereby track the pen, the dynamically selected sequence selected based on a detected location of the pen relative to the touch sensor and being varied as the detected location changes in the tracking mode; and
upon locating a finger and detecting an absence of the pen, operate the touch sensor in a finger mode by driving the touch sensor with a time-varying voltage according to the predefined sequence.

18. The touch-sensitive input device of claim 17, where the touch-sensitive input device further comprises receive circuitry, and where the predefined sequence is defined such that each of a plurality of portions of the touch sensor is successively multiplexed to the receive circuitry in a touch frame.

19. The touch-sensitive input device of claim 1, where each portion of the touch sensor comprises a plurality of electrodes, and where the receive circuitry includes a plurality of receivers equal in number to the plurality of electrodes.

* * * * *